March 29, 1932.  R. EHRENFELD  1,851,572
MOTOR STRUCTURE
Filed April 11, 1929   3 Sheets-Sheet 1
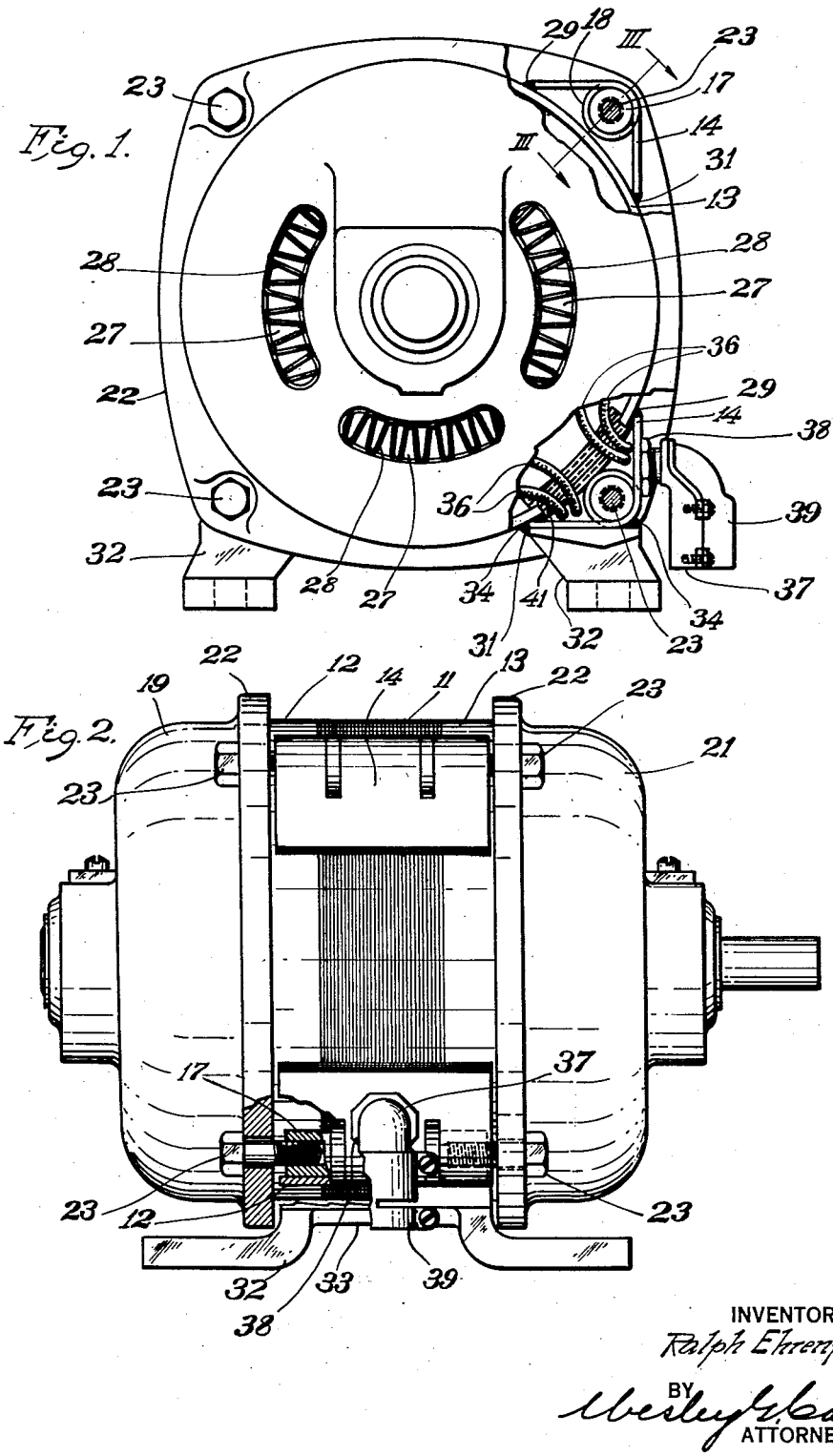
INVENTOR
Ralph Ehrenfeld.
BY
Wesley G. Carr
ATTORNEY

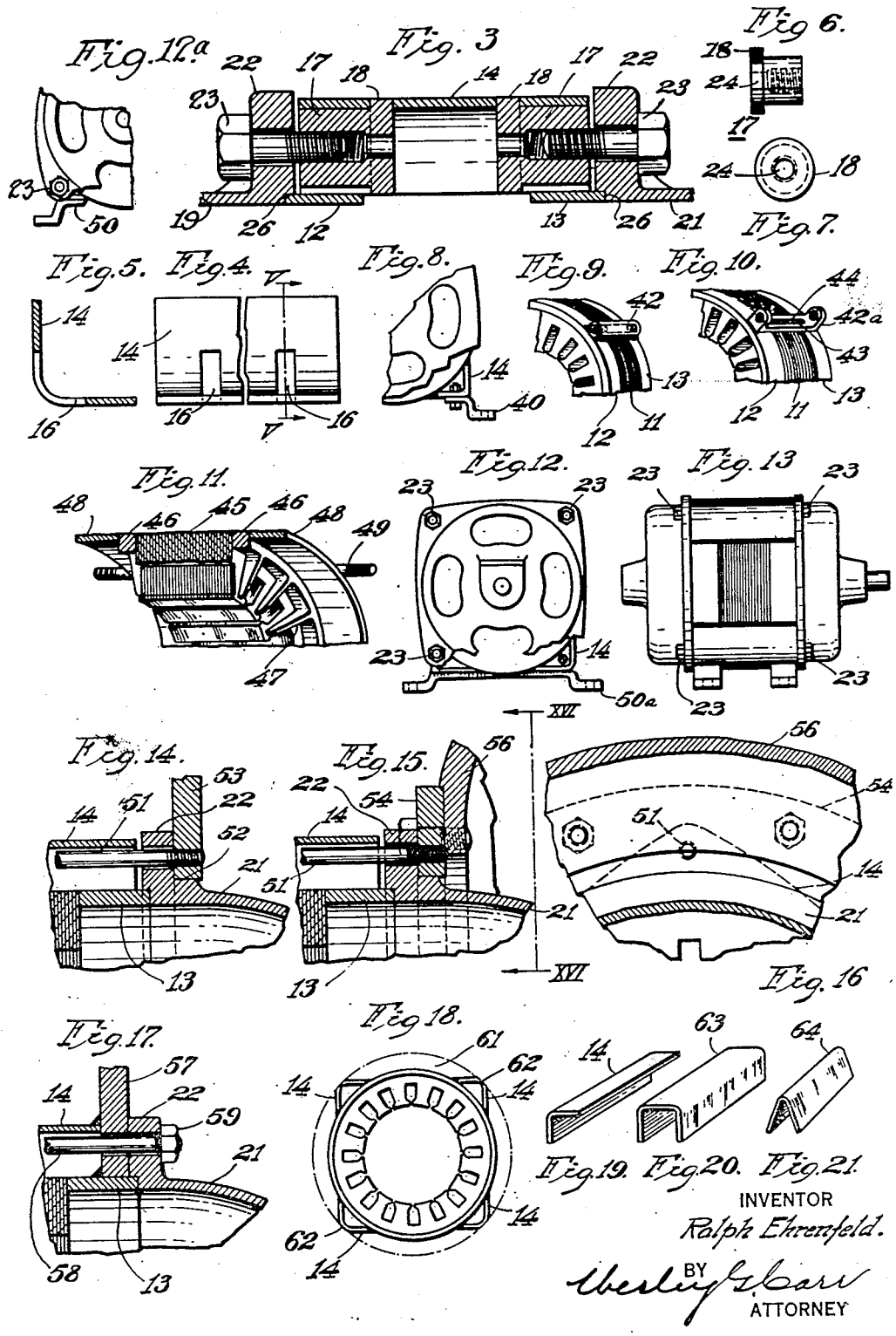

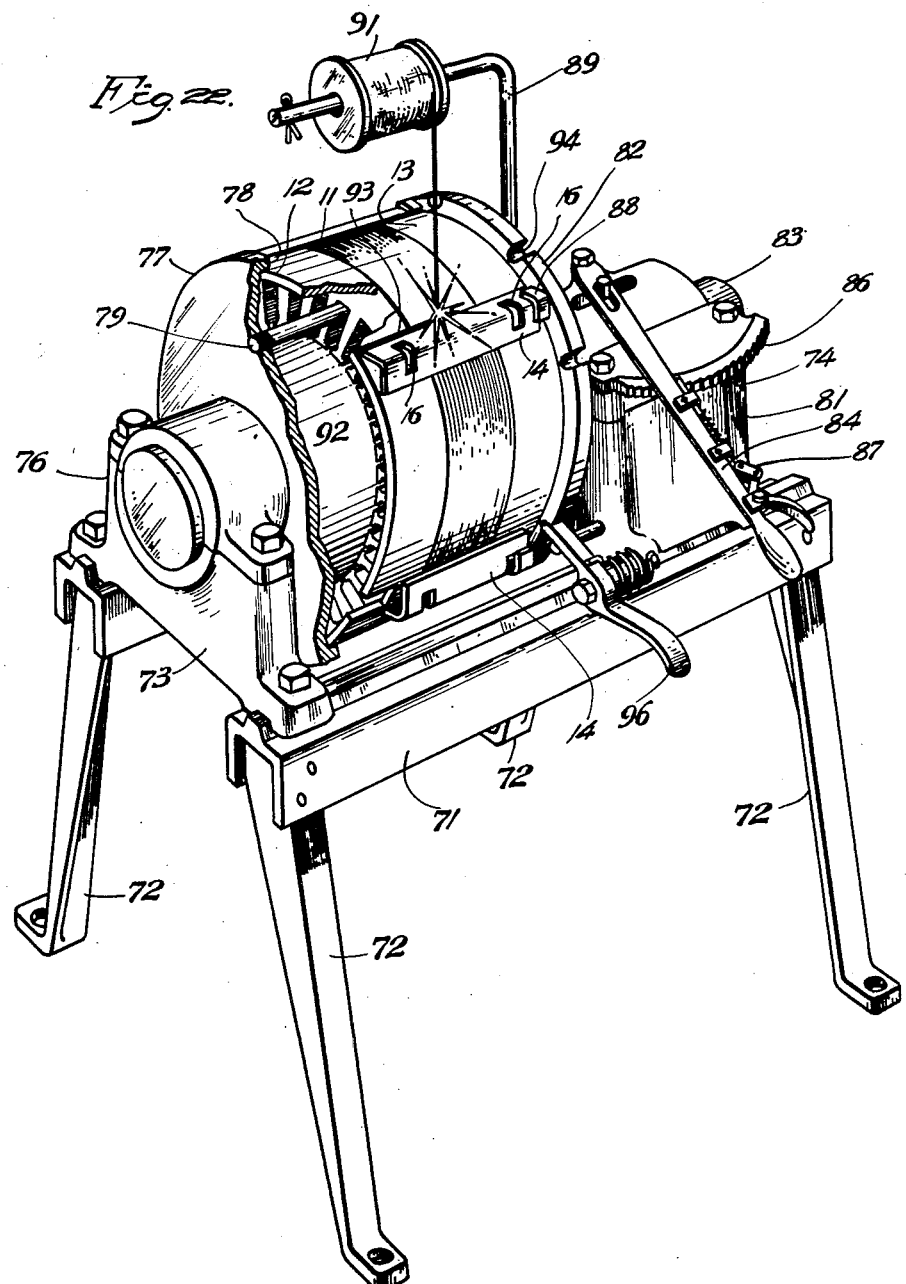

Patented Mar. 29, 1932

1,851,572

UNITED STATES PATENT OFFICE

RALPH EHRENFELD, OF SPRINGFIELD, MASSACHUSETTS, ASSIGNOR TO WESTINGHOUSE ELECTRIC & MANUFACTURING COMPANY, A CORPORATION OF PENNSYLVANIA

MOTOR STRUCTURE

Application filed April 11, 1929. Serial No. 354,265.

My invention relates to electric motors and particularly to stator structures therefor.

An object of my invention is to provide a method of assembling a relatively simple and light-weight frame structure for the stator of a motor.

Another object is to provide a relatively simple frame structure for the stator of an electric motor which shall embody a minimum number of parts.

Another object of my invention is to provide a relatively simple and highly efficient welded-frame structure for an electric motor.

Another object of my invention is to provide a simple, welded-frame structure for an electric motor adapted to cooperate directly with the periphery of the stator laminations in holding the parts of the stator in their proper operative positions.

Another object of my invention is to provide a relatively simple frame or stator structure that shall be adapted to cooperate with supporting structures with which the motor may be operatively associated.

Another object of my invention is to provide a means for and a method of welding, clamping or securing members to the periphery of an assembled stator.

In practicing my invention, I provide a set of stator laminations having spacing rings operatively associated therewith at each side thereof and a plurality of elongated metal members extending longitudinally of the stator laminations having one or more seams of welding metal securing each elongated metal member to the outside periphery of the laminations and of the end or spacing rings.

Suitable clamping means are provided to cooperate with the elongated metal members to securely clamp the bearing housings against the end rings. Feet or other supporting members for the motor are welded or bolted to certain of the welded-on elongated metal members. One or more of the end bells or bearing housings are provided with arcuate, ventilating openings therethrough, in which are located resilient return-bent screen members.

In the drawings,

Figure 1 is a view, mainly in end elevation, of a motor embodying my invention, portions thereof being cut away to show details of construction, Fig. 2 is a view, in side elevation, of the motor shown in Fig. 1 a small portion being cut away to show details of construction, Fig. 3 is a fragmentary view, in longitudinal section, taken on the line III—III of Fig. 1, Fig. 4 is a view, in side elevation, of a member of trough shape for holding a set of laminations in assembled relation, Fig. 5 is a view, in lateral section, taken on the line V—V of Fig. 4, Figs. 6 and 7 are views, in side and in end elevation, respectively, of a nut cooperating with the member of trough shape, shown in Figs. 4 and 5, Fig. 8 is a fragmentary view, in end elevation, of one form of motor-supporting means, Fig. 9 is a fragmentary view, in perspective, of a modified form of welded-on frame member, Fig. 10 is a fragmentary view, in perceptive, of another form of welded-on frame member, Fig. 11 is a perspective view of a modified form of a portion of a device embodying my invention, Figs. 12a and 13 are views, in end and in side elevation, respectively, of another modification of a device embodying my invention, Fig. 12 is a fragmentary view in end elevation of a motor having associated therewith a further modification of a device embodying my invention, Figs. 14 and 15 are fragmentary views, in longitudinal section, of a construction embodying my invention, showing different forms of mounting means, Fig. 16 is a fragmentary sectional view of the construction shown in Fig. 15, taken on the line XVI—XVI thereof, Fig. 17 is a sectional view of a portion of a still further modification of a stator assembly cooperating with a driven device, Fig. 18 is a schematic view, showing still another form of mounting a motor structure embodying my invention, Figs. 19, 20 and 21 are views, in perspective, of different forms of members of trough shape, and, Fig. 22 is a view, in perspective, of a device for practicing my improved method of assembling and welding stator structures.

Referring more particularly to Figs. 1 and 2 of the drawings, I have there shown a set of stator laminations 11 and two annularly-incomplete end rings 12 and 13, which are to be located in tightly assembled side-by-side and coaxial relation. It is to be understood, of course, that the set of stator laminations 11 may be of any size, as to internal and external diameters, and that the laminations may be provided with any number and shape of slots to receive the usual stator winding, which is not shown in the drawings because of space limitations and because such windings are common in the art and do not constitute parts of my invention. Also, the number of laminations may be varied, as may be desired or may be necessary. The incomplete end rings or spacer rings 12 and 13 may also be of any suitable or necessary width in order to cover and provide space for the end or cross-connecting portions of the stator coils, in a manner well known in the art.

A plurality of elongated metal members, either of trough-shape in lateral section or of rod shape, in modifications thereof, are operatively associated with the periphery of the stator structure including laminations 11 and the end rings 12 and 13. One form of these members of trough-shape is indicated at 14 in Fig. 1 of the drawings and it may be noted that this member is of substantially angle-bar construction and that it is substantially coextensive with the combined axial lengths of the members 11, 12 and 13.

Reference may be had to Figs. 3 to 5, inclusive, for detail views of the angle-bar members 14 and it may be noted that they may be made of a sheet-steel punching or plate which may be bent to angle-bar shape or that it may embody a relatively thin rolled structural steel member of angle-bar shape in lateral section or it may be a casting.

A plurality of the members 14 are provided in any stator structure and, in the smaller or fractional-horsepower motors, I prefer to use four of these members, spaced substantially ninety mechanical degrees apart peripherally of the stator structure. Of course, if desirable, a larger number of such members could be used, but I prefer to use either four of such members or a multiple thereof in order that it may easily be possible to mount the motor on a supporting structure on the floor, on the ceiling, or on either of two side walls.

Each member 14 is provided with two laterally extending openings or slots 16 therein, located relatively closely to its ends. Nuts 17, each comprising a tubular body portion and an enlarged flange portion 18, are located in the respective members 14, the enlarged flange portion 18 fitting into one of the openings or slots 16, while the body portion engages the inner arcuate surface of the member 14 to fit closely therein, substantially as shown in Figs. 1 and 3 of the drawings.

End bells 19 and 21 are of substantially standard construction and have flanges 22 which are severally provided with bolt-holes corresponding, in number and spacing, to the members 14. Bearings of any suitable or desired kind are provided, centrally of the end bells, but, as these have no special relation to my invention, they are not shown in specific detail. Bolts 23 extend through the flanges 22 of the end bells and into threaded openings 24 in the nuts 17 whereby the end bells are securely clamped against the outer edges of spacer rings 12 and 13.

It may be noted, by reference to Fig. 3 of the drawings, that an internal shoulder 26 is provided in each of the end bells 19 and 21 which fits over the outer edge and the periphery of the corresponding end rings 12 and 13.

I prefer to so shape and locate the end rings 12 and 13, during the initial stages of manufacture of the stator structure, that the outer diameters, thereof, will be slightly greater than the internal diameters of the shoulders 26 and then turn down their peripheries to a predetermined diameter which will just fit the shoulder 26, all of this being done, in a manner well known in the art, in order that the proper operative relations of the various parts of the stator structure and of the rotor may be obtained when the motor parts are finally completely assembled.

A plurality of ventilating openings 27, each of arcuate shape, may be provided in the radially extending wall of each of the end bells 19 and 21, each of which is provided with a relatively simple and effective guard. As shown more particularly in Fig. 1 of the drawings, I prefer to bend a narrow strip or a wire of spring metal into zig-zag form and of proper width to fit into the respective openings 27 radially thereof, substantially in the manner shown at 28. The return-bent member 6 or screens 28 of resilient material will, of course, be resilient in substantially every direction and will fit easily into the openings 27, the end or return-bent portions serving to operatively engage the metal at the sides of the openings 27 to yieldingly engage them and be held in the positions shown. The screens 28, being of skeleton shape, may be easily inserted and removed and are effective to prevent accidental entry of objects or material into the interior of the motor which might damage the rotor or the stator structure. It is possible to hold the skeleton guards by means of screws entering the walls of the respective openings, if desired.

Two seams 29 and 31 of welding or welded-on metal are provided for each of the members 14 in order to secure them against the periphery of the stator laminations, as well as against the outer surfaces of the end or spacer rings 12 and 13. It is, of course, desirable to temporarily clamp the two end rings and the set of stator laminations in tightly assembled relation, a means for and a method of doing this being hereinafter set forth in detail.

A plurality of supports or feet 32 may be provided for each motor and, as shown more particularly in Figs. 1 and 2 of the drawings, each of these supports or feet may comprise a casting or a forging of iron or steel, having an intermediate raised portion 33, (see Fig. 2) which may be welded to the bottom surface of the bottom members 14, each foot being secured against a member 14 by two seams 34 of welding metal, substantially as shown in Fig. 1 of the drawings, at the lower right-hand corner thereof.

Each of the end rings 12 and 13 is incomplete, the gaps being located between the edges of the members 14, and being spanned by insulating pieces 41 as is shown at the lower right hand corner of Fig. 1 of the drawings, in order that a plurality of terminal leads 36, connected to the stator or energizing winding (not shown) may be brought therefrom and outside of the motor. The vertically extending face of the member 14 may be provided with threaded opening to receive a threaded end of a conduit member 37, of substantially L-shape, a lock nut 38 being provided thereon to insure that the member 37 will be held in substantially the position shown in the drawings. The member 37 may be of any suitable or desired form and is shown as having a cover 39, which may be so secured thereon as to be removable in order to permit of easier manipulation of the leads 36. The leads 36 extend outwardly between the spaced ends of the spacer ring 12, the leads then extending longitudinally of the stator structure and laterally, between two nuts 17, into the conduit 37, beyond which they may be connected to supply-circuit conductors, in a manner well known in the art.

Referring to Fig. 8 of the drawings, I have there shown a support or foot 40 bolted to a member 14 instead of being welded thereto.

Fig. 9 illustrates, as a substitute for the parts 14, 17 and 18 of the preceding figures, a tubular member 42 having interior screw threads at each end to receive a bolt, such as the bolt 23 hereinbefore described. The other parts illustrated include end rings 12 and 13 and a set of laminations 11.

Fig. 10 illustrates another modification which embodies an elongated metal member 42a, which is of substantially channel shape, longitudinally thereof, and has a longitudinal slot 43 therein to receive a seam 44 of welding metal. The upturned ends are provided with screw threaded openings to receive bolts, such as the bolts 23 hereinbefore described as extending through the flanges of the end bells. The other parts illustrated include end rings 12 and 13 and a set of laminations 11.

Referring more particularly to Fig. 11 of the drawings, I have there shown a set of stator laminations 45, which may be of any suitable or desired size and number and provided with slots of any desired or suitable number and size and, in this case, it is desired that a plurality of end rings 46, having fingers 47 integral therewith and equal in number to teeth in the stator laminations, shall be operatively associated therewith in order that there may be no possibility of vibration and possible breakage of the teeth of the laminations during operation of the motor. The end or spacer rings 48 may, therefore, be made relatively narrow, in order that they may cover, and provide suitable space for, the end connections of the stator winding.

Fig. 11 shows also a modified form of longitudinally extending frame member, here shown as a rod 49 which may be welded to the members 45, 46 and 48 in substantially the manner described above for the members 14, that is, by means of two seams of welding metal, one located at each side of the member 49. The end bells 19 and 21 will, therefore, be held against the end rings by means of nuts cooperating with the threaded end portions of the rods 49.

Referring more particularly to Figs. 12a and 13, I have there illustrated a somewhat different form of supporting means, each motor being provided with feet 50 of substantially Z-shape which may be made of cast, rolled or forged metal and have one end portion thereof welded or bolted in any suitable or desired manner against the members 14.

It is, of course, obvious that, instead of utilizing four members 49, the members 50 may be made of substantially the same shape as the feet 32, with a possible increase in the length of the intermediate portion thereof in order to extend from one side of the motor to the other or from one member 14 to the other, although this may not always be possible for the reason that the members 14, in stators of the larger sizes, will not be large enough to have one side portion thereof substantially tangential with the outer periphery of the stator. Support 50a, shown in Fig. 12, illustrates a foot of the kind just mentioned and is shown as being welded not only to the angle bar members 14 but also to the laminations 11.

Fig. 14 illustrates a fragmentary view of a motor structure, showing how a motor of the general type shown in Figs. 1 and 2 may be operatively mounted on the frame of a driven device. In this case, rods 51, located within the respective members 14, extend through the openings in the end bell and particularly in the end bell 21, which is provided with a shoulder 52 into which fits a suitably shaped member 53 of the structure of the driven device. The rods 51 may be screwed into the member 53 which, as noted above, will have a substantially circular opening therein to receive the end bell 21, and nuts may be screwed up on the other threaded ends of the rods to hold all parts of the motor structure in closely assembled and proper operative positions relatively to each other. Instead of screwing the rods 51 into the member 53, the member may be provided with enlarged openings, not screw-threaded, and nuts may be mounted on both ends of the rods 51. It is possible also to use the welded-on bolts 49, shown in Fig. 11, for the same purpose.

Referring more particularly to Figs. 15 and 16 of the drawings, I have there illustrated a mounting for a motor structure, in which the customer's device will not permit of use of the construction shown in Fig. 14, an intermediate mounting ring 54 being, therefore, provided which may be bolted against the end bell 21 in substantially the manner set forth hereinbefore for the construction shown in Fig. 14. The driven device is provided with an annular portion 56, which may cooperate, in any suitable or desired manner, with the annulus 54, and the relative dimensions of members 54 and 56 may be varied, as demanded or required by the details of construction of the driven device and of the motor, the main object being, of course, to insure proper mounting of the motor on the driven structure.

Fig. 17 shows a still further modification, in which a driven device is provided with an annular member 57, which is adapted to fit within the flange 22 of the end bell 21 and one end of the member 14, and is to be tightly clamped therebetween by suitable rods 58 and cooperating nuts 59. It is, of course, obvious that proper provision must be made to insure that the cooperating parts of the motor strucure and of the driven device fit, one within or without the other, in order that an extension of the motor shaft may be located in a desired place relatively to the driven device. Instead of clamping the member 57, it may be welded against the end ring 13 and the member 14, as shown in this figure.

Fig. 18 illustrates how a motor structure of the kind shown more particularly in Figs. 1 and 2 of the drawings may be located within a circular opening 61 of a driven structure and be held therein by turned portions of the external surface of the members 14 and, of course, more particularly the intermediate portion, each member 14 being turned down slightly, as shown at 62, in order to insure a tight and proper fit within the opening 61 and more particularly against the wall of this opening. It is to be understood, of course, that the flanges 22 of the end bells will not extend beyond the largest diameter of the members 14, as is the case in Figs. 1 and 2 of the drawings, but that these flanges will be smaller in diameter, which may easily be taken care of in the design and in the machining of these parts.

Figs. 19, 20 and 21 show different forms of members of trough-shape which may be employed in the device embodying my invention, Fig. 19 showing a member 14 of substantially angle-bar shape in lateral section. Fig. 20 shows a member 63 of channel-shape and Fig. 21 shows a member 64, of substantially V-shape in lateral section. Reference may again be made to element 58, shown more particularly in Fig. 17 of the drawings, to indicate that a rod or bolt member may be used so long as it may be provided with exteriorly screw-threaded ends to receive clamping nuts.

Referring more particularly to Fig. 22 of the drawings, I have there illustrated a device for practicing the method of assembly of my improved stator structure.

A lathe bed 71 is provided with a plurality of legs 72 a bearing structure 73 at one end thereof and a bearing structure 74 at the other end thereof. The bearing structure 73 may be considered to be the head-stock of a lathe and the element 74 to be the tail-stock thereof. The structure 73 comprises, in addition to a substantially stationary portion 76, a face plate 77 which is provided with an annular flange 78 at its front surface for receiving and holding one edge of the spacer ring 12. An aligning rod 79 extends forwardly of the face of the face-plate 77 in order that the set of stator laminations may be properly aligned longitudinally, the rod 79 being of the proper dimension to fit into one of the slots of the stator laminations.

The tail-stock 74 comprises, in addition to a substantially stationary portion 81, a rotatable face plate 82 and means for moving it and its cooperating shaft 83 longitudinally of the device 71, this movement being effected by a suitable lever 84 which may be manually operated. A ratchet member 86, of arcuate shape, is provided on the portion 81 to cooperate with a suitable pawl 87 on the lever 84 to hold the face-plate 82 in any desired clamping position.

Both face plates 77 and 82 are provided with integral lugs 88, having inner faces of substantially L-shape for engaging the outer surfaces of the members 14 to hold these members in position as the face plate 82 is moved toward the face plate 77 to tightly clamp the end rings 12 and 13 and the laminations 11 together.

A support 89 is provided for a spool of welding wire 91, the end of which may be brought into arcing relation with the edges of the members 14 in sequence and, of course, with the closely adjacent surfaces of the members 11, 12 and 13, in order to deposit a seam of welded metal therebetween or thereon so that the members 14 may be maintained in their desired positions, as hereinbefore set forth.

A method of assembly and of welding, as practiced with the device shown in Fig. 22 may be briefly set forth, although, of course, it is to be understood that such modifications may be made therein as may be suitable or found desirable in order that quicker assembly and welding of the stator structures may be effected in order to reduce the cost of assembly of the motor frames.

The end ring 12 may be located within the shoulder provided by the flange 78 of the face plate 77. The proper number of stator laminations 11 may then be placed thereagainst, it being noted that a central core portion 92, integral with the face plate 77, is provided for receiving the stator laminations. The end ring 13 may then be placed in proper operative position against the face plate 82, which is also provided with an exterior overhanging portion or flange corresponding to the flange 78, after which the members 14 may be located against the peripheries of the stator laminations. These members 14 may have one end pushed under the lugs 88 in order to hold them and the lever 84 may then be moved to the left to clamp the end rings against the stator laminations. The inner faces of the lugs 88 may be angularly inclined in order that the members 14 may be tightly clamped against the periphery of the stator structure, this clamping action increasing as the face plate 82 is moved toward the face plate 77 to clamp the end rings tightly against the laminations 11.

While I have indicated the welding wire 91 and its support generally only, it is to be understood that the wire is connected to a suitable source of supply of electric energy, the other terminals being connected to the structure 71, and, if direct-current electric energy is used, I prefer, of course, to ground the metallic parts of the structure 71 for the sake of safety of the operator. Any suitable or desired means (not shown) may be provided to guide the end of the wire 91, in order that proper welding action and a deposit of a seam of metal, indicated by the numeral 93 in Fig. 22 of the drawings, may be effected.

When one seam of metal has thus been deposited, the stator structure and the two face plates may be turned through a proper angle in order to deposit a seam of welding metal at the other edge of the member 14. For purposes of holding the stator during the welding of any one seam, one of the face plates, here shown as face plate 82, may be provided with a plurality of peripherally spaced recesses 94, a pawl 96 being provided which is spring-pressed into the respective recesses so that it is only necessary to move the pawl out of one recess, turn the stator structure until the inner end of the pawl again fits into a recess, when the stator structure will be properly located for another welding operation.

After all of the longitudinally-extending metal clamping members, of either rod or trough shape in lateral section, have been secured against the stator laminations and the spacer rings by seams of welding or welded metal, the stator structure thus assembled may be removed for further operations, such as winding the energizing coils into the slots and the assembly of the rotor and the end bells.

While the nuts 17 are not shown in Fig. 22 of the drawings, it is to be understood that they are placed within the members 14 before these members are located in the positions shown in this figure of the drawings.

Suitable modifications may be made in the assembly and welding rig shown in Fig. 22 when using the longitudinally-extending members 42, 42a, or 49 of Figs. 9, 10 and 11. It may be noted that member 42a, requires only one central seam of welding metal, whereas the other members require two seams, one at each edge.

The frame structure embodying my invention provides a plurality of elongated metal members which may be of various shapes in lateral section, which are directly operatively associated with the stator laminations and are secured thereagainst in retaining and tightly clamping relation, each by one or more seams of welding metal either centrally or at the edge portions thereof. By clamping relations is here meant, more particularly, the longitudinal clamping relation in order that the laminations and the end rings may be maintained in their initially determined and tightly assembled operative relations.

When trough members are used against the periphery, they may easily be provided with means cooperating with bolts extending through flanges on the end bells to hold the end bells and the bearing housings in their proper operative positions in the motor structure. If rod members are used, the ends thereof need only be provided with screw threads and extended through holes in the flanges of the end bells to receive nuts to similarly clamp the end bells in proper operative positions.

A relatively simple type of foot or supporting means for the motor may be employed and be easily and quickly welded or bolted in place.

The structure embodying my invention provides relatively simple means constituting a frame structure in which the parts are effective for more than one purpose and the most efficient use is, therefore, made of all of the parts entering into the improved motor structure.

The motor structure embodying my invention cooperates in a very simple manner with driven devices or machines and may, therefore, be easily and quickly adapted to a variety of such uses and devices.

Since various modifications may be made in the device and in the method embodying my invention without departing from the spirit and scope thereof, I desire that only such limitations shall be placed thereon as are imposed by the prior art or are set forth in the appended claims.

I claim as my invention:

1. In a motor assembly embodying a set of stator laminations, and spacer rings, one at each end of the laminations, means for holding the end rings and laminations in tightly assembled relation, said means comprising a plurality of peripherally spaced angle bars having their edges operatively engaging the outer peripheries of the laminations and the spacer rings, and seams of welded metal directly connecting the edges of the angle bars and the laminations and spacer rings, motor-supporting feet, and welded metal seams securing the feet to the angle bars.

2. In a motor assembly embodying a set of stator laminations, a spacer ring at each end of the set of laminations and a bearing bracket at each spacer ring, a plurality of spaced angle-bars having their edge portions operatively engaging the peripheries of the laminations and the spacer rings, seams of welded metal connecting the angle bars and the spacer rings, nuts within the angle bars having portions interfitting therewith, and bolts extending through the bearing brackets and into the respective nuts to hold the bearing brackets in proper operative positions.

3. In a motor assembly embodying a set of stator laminations, a spacer ring at each end of the set of laminations, and a pair of bearing brackets, means for holding all of said members in proper operative positions relatively to each other, said means comprising a plurality of peripherally-spaced angle bars having their edge portions only secured to the laminations and spacer rings and having lateral slits in their intermediate portions, nuts within the angle bars having shoulders fitting into the slits, and bolts extending through the bearing bracket and into the nuts.

4. In a motor assembly embodying a set of stator laminations, an energizing winding associated therewith, and terminal leads therefor, means for holding the stator laminations in tightly assembled relation comprising a plurality of metal members of trough-shape having their edges only in operative engagement with the peripheries of the laminations, and a laterally-extending opening in one of said members of trough-shape through which the terminal leads extend outwardly.

5. In a motor stator assembly embodying a set of stator laminations, and spacer end rings therefor, at least one of said end rings being of less than 360 degrees peripheral extent, a plurality of peripherally-spaced metal members of substantially trough-shape having their edge portions only engaging the peripheries of the laminations and spacer end rings, one of said members of trough-shape having a lateral opening therethrough and being peripherally aligned with the gap in one of said spacer end rings to permit the terminal leads of the motor to extend outwardly therethrough and seams of welding metal at each side of the members of trough-shape to secure them to the laminations and end rings.

6. In a motor assembly having a set of stator laminations and a spacer ring at each end thereof, a plurality of peripherally spaced longitudinally-extending elongated metal members operatively engaging the outer peripheries of the laminations and the spacer rings, a seam of welded metal securing each elongated metal member to the laminations and spacer rings, motor-supporting feet, and means for securing the motor-supporting feet to the elongated metal members and the laminations.

In testimony whereof, I have hereunto subscribed my name this second day of April, 1929.

RALPH EHRENFELD.